Nov. 7, 1933.　　　　O. KYLIN　　　　1,934,358
AUTOMATIC TURRET CLAMP
Filed March 31, 1932　　　2 Sheets-Sheet 1

Inventor
OSKAR KYLIN

By Richey & Watts
Attorneys

Nov. 7, 1933.    O. KYLIN    1,934,358
AUTOMATIC TURRET CLAMP
Filed March 31, 1932    2 Sheets-Sheet 2
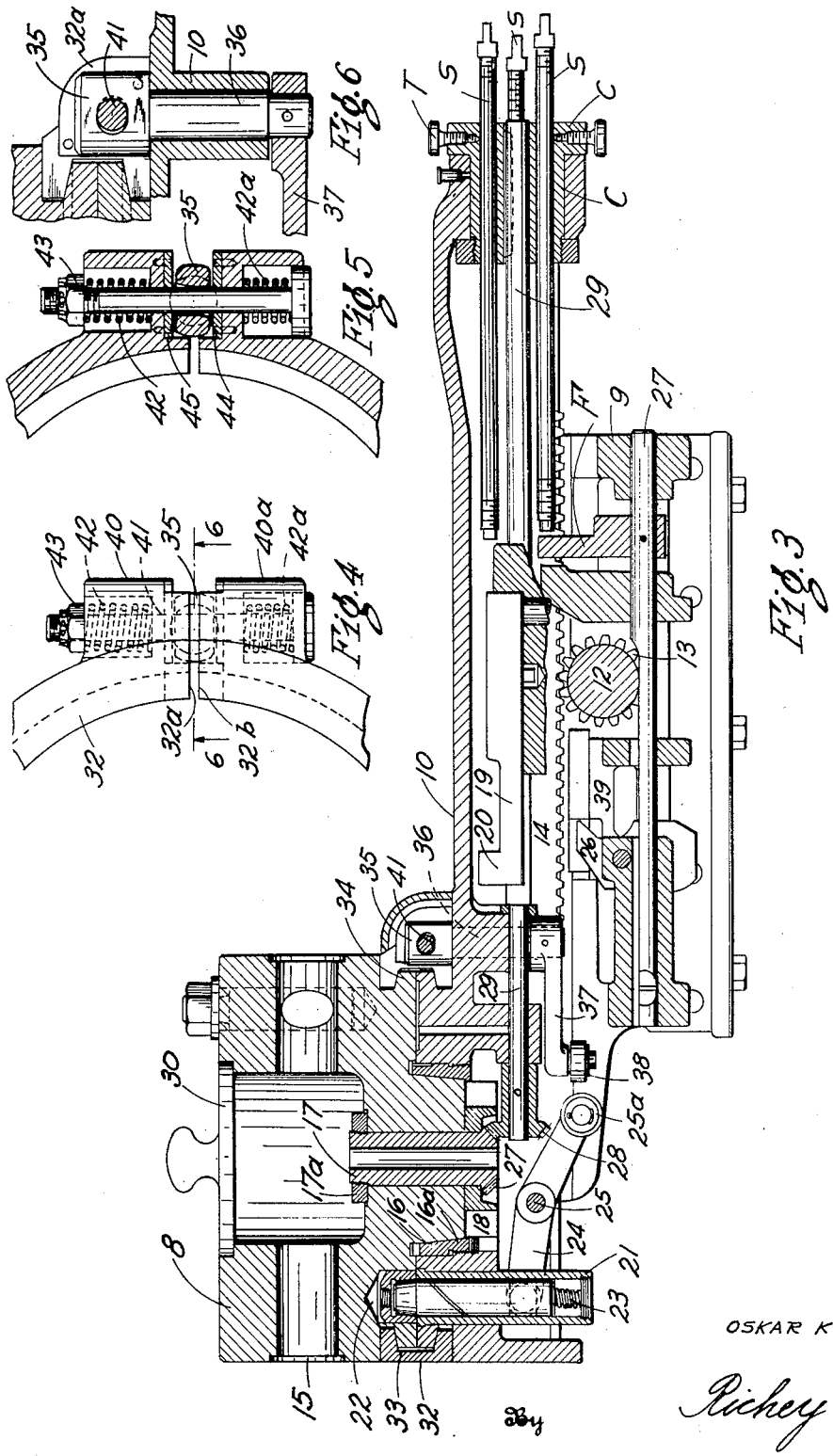
Inventor
OSKAR KYLIN
Richey & Watts
Attorneys Patented Nov. 7, 1933

1,934,358

UNITED STATES PATENT OFFICE 1,934,358

AUTOMATIC TURRET CLAMP

Oskar Kylin, Cleveland Heights, Ohio, assignor to John G. Oliver, Cleveland, Ohio, doing business as Bardons & Oliver Application March 31, 1932. Serial No. 602,167

5 Claims. (Cl. 29—49)

This invention relates to turret lathes broadly and more specifically to turret locking or clamping mechanism for such lathes.

The primary object of the invention is the provision of a turret clamp which may be conveniently adjusted in accordance with the character of work to be performed, or, in other words, the clamping action on the turret may be readily adjusted to take care of heavy or light tool work and thus eliminate needless expenditure of energy incident to the turret-clamping operation. Another object is the provision of a turret clamp which is expanded and contracted automatically in synchronism with turret indexing means by advancing and retracting the turret slide and which, at the same time, has a resilient turret-clamping action which is adjustable independently of the turret releasing action.

The foregoing and other objects and advantages will become apparent in view of the following description taken in conjunction with the drawings, wherein:—

Fig. 3 is a transverse vertical sectional view taken substantially on the line 3—3, Fig. 2, showing the slide advanced and the turret in locked position;

Figs. 3, 5 and 6 are, respectively, fragmentary views in plan, horizontal and vertical section of the meeting ends of the clamp and the clamp-actuating mechanism.

Figure 1:
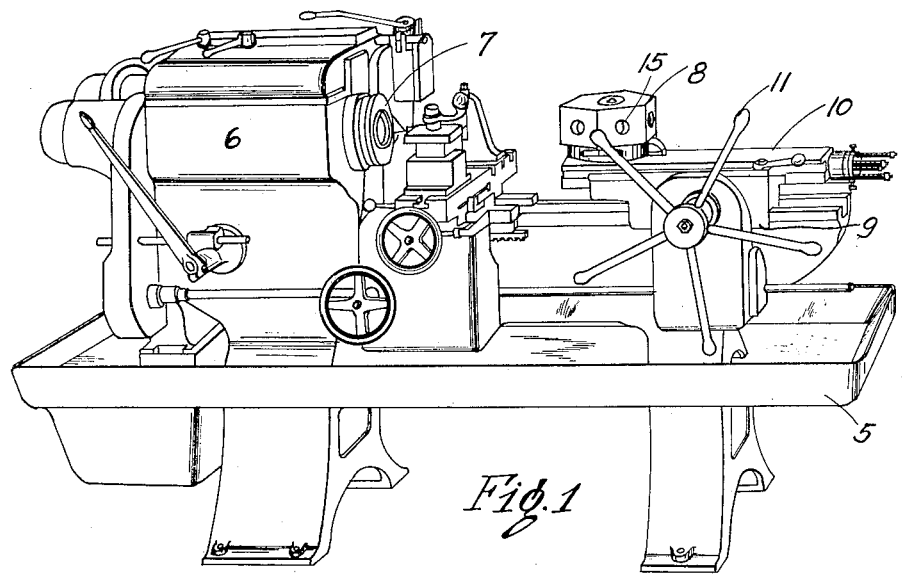
Figure 1 is a view in perspective of a turret lathe embodying the features of the invention.

Referring to the drawings in detail, Fig. 1 shows a turret lathe of the conventional type in which the reference numeral 5 generally designates the main supporting frame, 6 the head stock, 7 the chuck, 8 the turret, 9 the turret saddle and 10 the turret slide on which the turret is mounted. The side 10 and turret 8 are movable on the saddle 9 and may be advanced toward and retracted from the work by means of the hand wheel 11, which is fixed on a shaft 12 (note Fig. 3) provided with a pinion 13 which engages a rack 14 secured to the slide.

The turret 8 is of the hexagonal type and is provided with a series of tool sockets 15 in the faces thereof, said sockets being adapted to receive and grip the shanks of varying sizes of tools. As will be understood, means are provided for rotating the turret to bring the desired tool to a working position in accordance with the work in the chuck 7, the turret being accurately positioned or spotted by indexing mechanism and then securely clamped in spotted position during the turning, or other machining operation, by clamping means controlled primarily by the movement of the turret slide.

The turret 8 is provided with a lower bearing portion 16 which is mounted in a bearing 16a secured to the frame of the slide 10. The bottom surface of the turret which surounds said bearing portion also bears on the adjacent frame of the slide 10. Fixed in the central portion of the turret is a spindle 17 which is provided on its lower extremity with a ratchet gear 18, said gear being provided with a series of ratchet teeth, there being one tooth for each face of the turret 8. The gear 18 is actuated by means of a pawl 19, which is pivotally mounted on the frame of the saddle 9 and is provided with an end portion 20 adapted to engage the teeth of the gear 18. When the slide carrying the turret and ratchet gear 18 therewith is retracted, the end 20 of the pawl 19 engages the teeth of the said gear and imparts a partial rotation to the turret 8. The spindle 17 is held in assembled position by a lock nut 17a.

The indexing mechanism comprises a vertically movable index pin 21 adapted to engage in any one of a plurality of indexing sockets 22 formed in the bottom of the turret 8, there being one of these sockets for each face of the turret. The index pin 21 is depressed against the resistance of a spring 23 by a lever 24, which is fulcrumed on a pin 25 fixed to the frame of the slide 10. A cam roller 25a is rotatably mounted on one end of the lever 24 and is adapted for contact with a tumbler cam 26, pivotally mounted on a bracket rod 27 carried by the saddle 9. When the slide is retracted, the cam roller 25a engages the sloping face of the cam 26 (prior to engagement of the gear 18 with the pawl 19), causing the lever 24 to depress the pin 21 clear of the socket 22 leaving the turret free to be rotated by the pawl 19 to its approximate subsequent working position. The roller 25a then drops off the right hand (Fig. 3) end of the cam 26 permitting the pin 21 to engage the under side of the turret and to snap up into the next socket 22 in the turret when the socket and pin are aligned. When the slide is advanced, the roller 25a tumbles the cam 26 on its pivot and moves past the cam without moving the pin 21 from its locking position in the socket 22.

The lower end of the spindle 17 is provided with a bevel gear 27 which is in constant mesh with a bevel gear 28 mounted on the rod or shaft 29 which has suitable bearing in the frame of the slide 10. The end of the rod 29 opposite the end which carries the gear 28 is keyed or otherwise suitably secured to a turret stop carrying cylinder C which is rotatably mounted in the end of the slide 10. The cylinder C carries six adjustable turret stop screws S which have threaded engagement with the cylinder C and are adapted to be locked in any desired position by the thumb screws T. The stop screws S are adapted to engage the stop F on the saddle 9 to limit the forward or feeding movement of the turret and slide. It will be seen that rotation of the turret 8 will rotate the shaft 29 and the collar or cylinder C through the bevel gears 27 and 28 and the stop screws S will be successively positioned to engage the stop F and limit the forward movement of the turret and slide. By adjusting the positions of the screws S, the forward movement of the turret for each of its working positions may be regulated.

The central portion of the turret is provided with a cover 30, to permit access to the interior thereof.

Figure 2:
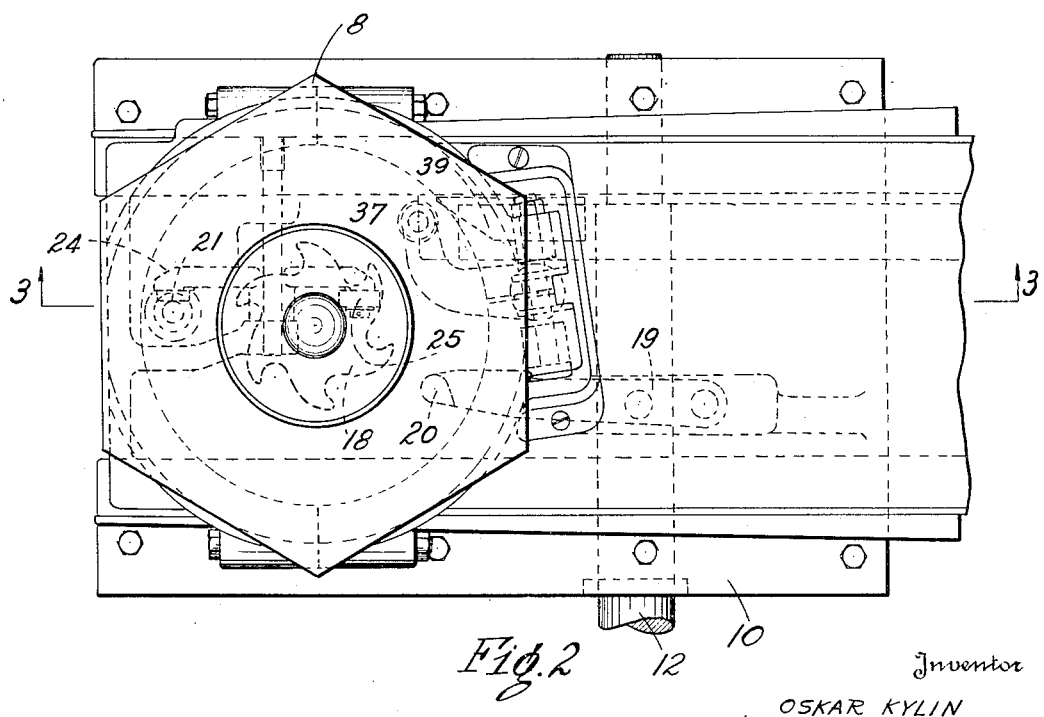
Fig. 2 is an enlarged plan view of the turret and a portion of the turret slide of Fig. 1, the latter being shown partly retracted.

The clamping mechanism, with which the present invention is particularly concerned, consists of a clamping ring 32 which is split and provided with opposed faces 32a and 32b. This ring may be formed in sections or segments and hinged, if desired, or may be made in one piece, the invention not being limited by the particular form shown. The inner surface of the ring is formed with a wedge-shaped groove or combined wedging and clamping portion 33 adapted to engage an annular wedge-shaped portion 34 defined by the lower extremity of the turret 8 and the frame of the slide 10. A spreader cam 35 is adapted to act on the opposed faces 32a and 32b of the ring 32, said cam being formed integrally with or secured to one end of a bearing pin 36 which projects through and has bearing in the adjacent frame of the slide 10. The lower end of the pin 36 has secured thereon a turret clamp lever 37 which has a cam roller 38 rotatably mounted on one end thereof, the roller being adapted to engage a cam 39, note Fig. 2, which is mounted in proper position on the adjacent frame of the saddle 9.

Each of the opposed end portions of the ring 32 is provided with a combined housing and bracket portion 40 and 40a, through which extends a clamp pin or bolt 41. Turret clamp springs 42 and 42a are seated in the housings 40 and 40a of the ring 32 around the pin 41, the tension of said springs being adjustable through the medium of a nut 43.

The spreader cam 35 is formed with a hole or bore 44 of a size and contour to accommodate the bolt or pin 41 and provide such a range of rocking or angular movement of the cam 35 as will permit unclamping of clamp ring 32. The opposed side walls of the bore 44 are preferably given a substantially convex or oppositely beveled contour to permit such action and, at the same time, limit play of the cam. Contact plates 45 are preferably secured to the opposed ends of the clamp 32.

The operation of the clamping mechanism just described will be readily understood. When the slide 10 and the turret 8 are retracted by rotating the hand wheel 11, the index pin will be lowered clear of the turret and the cam spreader 35 will spread the clamping ring 32 leaving the turret free to rotate. Further retracting movement of the slide will cause the end 20 of the pawl 19 to engage the ratchet gear 28 and rotate the turret into its next working position, whereupon the index pin will spring into locking position in the proper socket 22 in the turret. Upon reversing the rotation of the hand wheel 11, the slide 10 and turret 8 will be advanced toward the work and the cam roller 38 will clear the cam 39, thus permitting the clamping ring 32 to be contracted by means of the springs 42 and 42a. The forward movement of the slide and turret will be limited by the position of the stop screw S which corresponds to the particular face of the turret which is presented to the work. When the turret reaches the end of its forward movement, the mechanism is then ready for another retracting movement of the slide and indexing of the turret and repetition of the working cycle.

When the work is comparatively light, requiring only light duty tools, the tension of the clamp springs 42 may be adjusted to reduce the clamping action accordingly, thereby reducing the amount of work necessary to actuate the clamping mechanism. Since there is quite a diversity of work handled by lathes of this class, the labor as well as time thus saved is quite an item. Furthermore, the adjustment is conveniently located and easily accomplished, and advantages other than those herein noted will be apparent to those having a knowledge of the art.

Although I have described in considerable detail the illustrated embodiment of my invention, it will be understood by those skilled in the art that modifications and variations may be made without departing from the spirit of the invention. I do not therefore care to be limited to the exact form shown and described, but claim as my invention all embodiments thereof coming within the scope of the appended claims.

I claim:—

1. In a turret lathe, a slide, a turret rotatably mounted on said slide, means for advancing and retracting said slide and turret, and turret clamping means comprising an annular split clamping member formed with combined bracket and spring housing portions, springs seated in said housings, a spreader cam positioned between said housings, a clamp bolt passed through said housings and said springs, and means for imparting angular movement to said cam to spread said clamp against resistance of said springs.

2. In a turret lathe, a chuck for holding work, a slide, a turret rotatably mounted on said slide, means for advancing and retracting said slide and turret, means for rotating said turret to a definite predetermined angular position with respect to the work, indexing mechanism for said turret, and turret-clamping mechanism operated through advancement and retraction of said slide, said mechanism comprising an annular split clamping ring, a spreader cam positioned between adjacent ends of said ring, said cam being formed with a bore therethrough, springs positioned to oppose the spreading action of said cam, means controlled by said slide for imparting angular movement to said cam to spread the clamp, and means for adjusting the tension of said springs to thereby adjust the force of the clamping action upon release of said cam.

3. In a turret lathe, a turret slide, a turret rotatably mounted on said slide, a clamp for said turret, springs for normally urging said clamp to a contracted position, and a cam operated through movement of the slide for spreading said clamp against resistance of said springs.

4. In a turret lathe, a chuck for holding work, a turret slide, a turret rotatably mounted on said slide, means for advancing and retracting said slide and turret, means for rotating said turret to a definite predetermined angular position with respect to the work; and clamping mechanism for locking said turret in such position comprising an annular split clamping ring, a spreader cam positioned between the faces of said ring and formed with a bore therethrough, the opposed walls of said bore being formed with reversely beveled surfaces, springs positioned on opposite sides of the clamp ends to exert clamping pressure thereagainst in opposition to the action of said cam, a clamping bolt passed through said springs and the bore in said cam and holding the parts in assembled position, a lever for operating said cam, and a cam for operating said lever through retraction of said slide.

5. In apparatus of the class described, a slide, a turret rotatably mounted on said slide, means for advancing and retracting said slide and turret, and turret clamping means including a split annular clamping ring having spaced ends and adapted to clamp said turret to said slide when contracted, spring means tending to contract said split ring, a spreader cam positioned between said spaced ends of said ring and means, operated by the retracting movement of said slide, for imparting angular movement to said spreader cam to spread apart the ends of said ring against the resistance of said spring means.

OSKAR KYLIN.